United States Patent [19]
Bevins

[11] Patent Number: 5,478,379
[45] Date of Patent: Dec. 26, 1995

[54] AIR PURIFICATION CONVERSION CARTRIDGE FOR DEHUMIDIFIER

[76] Inventor: Rick C. Bevins, 11554 SE. 323rd, Auburn, Wash. 98002

[21] Appl. No.: 330,195

[22] Filed: Oct. 27, 1994

[51] Int. Cl.⁶ ................................................. B01D 53/04
[52] U.S. Cl. ................ 96/119; 96/135; 96/138; 96/142; 96/154; 55/279; 55/280; 55/356; 55/471; 55/472; 55/515
[58] Field of Search .......................... 95/91, 117; 96/118, 96/119, 134–136, 138, 140, 142, 153, 154; 55/279, 280, 356, 359, 385.1, 467, 471, 472, 485, 486, 494, 515

[56] References Cited

U.S. PATENT DOCUMENTS

| | | | |
|---|---|---|---|
| 1,067,693 | 7/1913 | van Calcar et al. | 55/472 X |
| 1,119,575 | 12/1914 | Corn | 55/516 |
| 1,866,659 | 7/1932 | Litle, Jr. | 96/134 X |
| 2,251,964 | 8/1941 | Stackhouse | 55/486 |
| 2,325,657 | 8/1943 | Barkness | 96/118 X |
| 2,394,923 | 2/1946 | Little | 55/472 X |
| 2,624,420 | 1/1953 | Elegar | 183/4 |
| 2,680,355 | 6/1954 | Colomb | 55/280 X |
| 2,776,723 | 1/1957 | Lester | 96/118 |
| 2,794,514 | 6/1957 | Risley | 55/486 X |
| 3,090,490 | 5/1963 | Yocum | 96/134 X |
| 3,178,269 | 4/1965 | McConnaughey | 23/284 |
| 3,312,041 | 4/1967 | Hill | 95/91 |
| 3,390,511 | 7/1968 | Norton | 95/91 |
| 3,695,009 | 10/1972 | Osteen | 55/385.1 X |
| 3,804,942 | 4/1974 | Kato et al. | 423/239 |
| 4,026,688 | 5/1977 | Patterson | 55/309 |
| 4,252,547 | 2/1981 | Johnson | 55/279 X |
| 4,385,911 | 5/1983 | Popeil et al. | 55/472 X |
| 4,450,756 | 5/1984 | Kling | 55/467 X |
| 4,737,173 | 4/1988 | Kudirka et al. | 55/472 X |
| 4,749,388 | 6/1988 | Francois | 55/221 |
| 4,784,048 | 11/1988 | Nelson | 55/467 X |
| 4,902,306 | 2/1990 | Burnett et al. | 55/486 X |
| 4,915,715 | 4/1990 | Oshima et al. | 55/208 |
| 5,221,520 | 6/1993 | Cornwell | 95/117 X |

FOREIGN PATENT DOCUMENTS

| | | | |
|---|---|---|---|
| 2045107 | 10/1980 | United Kingdom | 96/118 |

OTHER PUBLICATIONS

Speidel International Brochure entitled "Pacific Northwest Solution for Complete Drying & Dehumidification Services for All Construction Related Moisture Problems", Date printed unknown, estimated publication date Oct. 1992.

Speidel Devaporator Model M–'The Missile' Instructions & Operations, Date printed unknown, estimated publication date Nov. 1993.

*Primary Examiner*—Robert Spitzer
*Attorney, Agent, or Firm*—Kathleen T. Petrich

[57] ABSTRACT

A method of converting a dehumidifier (10) having a base portion (16), a center portion (18), an upper portion (20), a desiccant container (62), and receptacle container (36), to an air purifier (12). The method includes removal of the desiccant container (62) and replacing it with an air filter cartridge (94). The invention is also directed to the air purifier (12) and air filter cartridge (94) for converting from a dehumidifier (10) via the air filter cartridge (94).

27 Claims, 5 Drawing Sheets

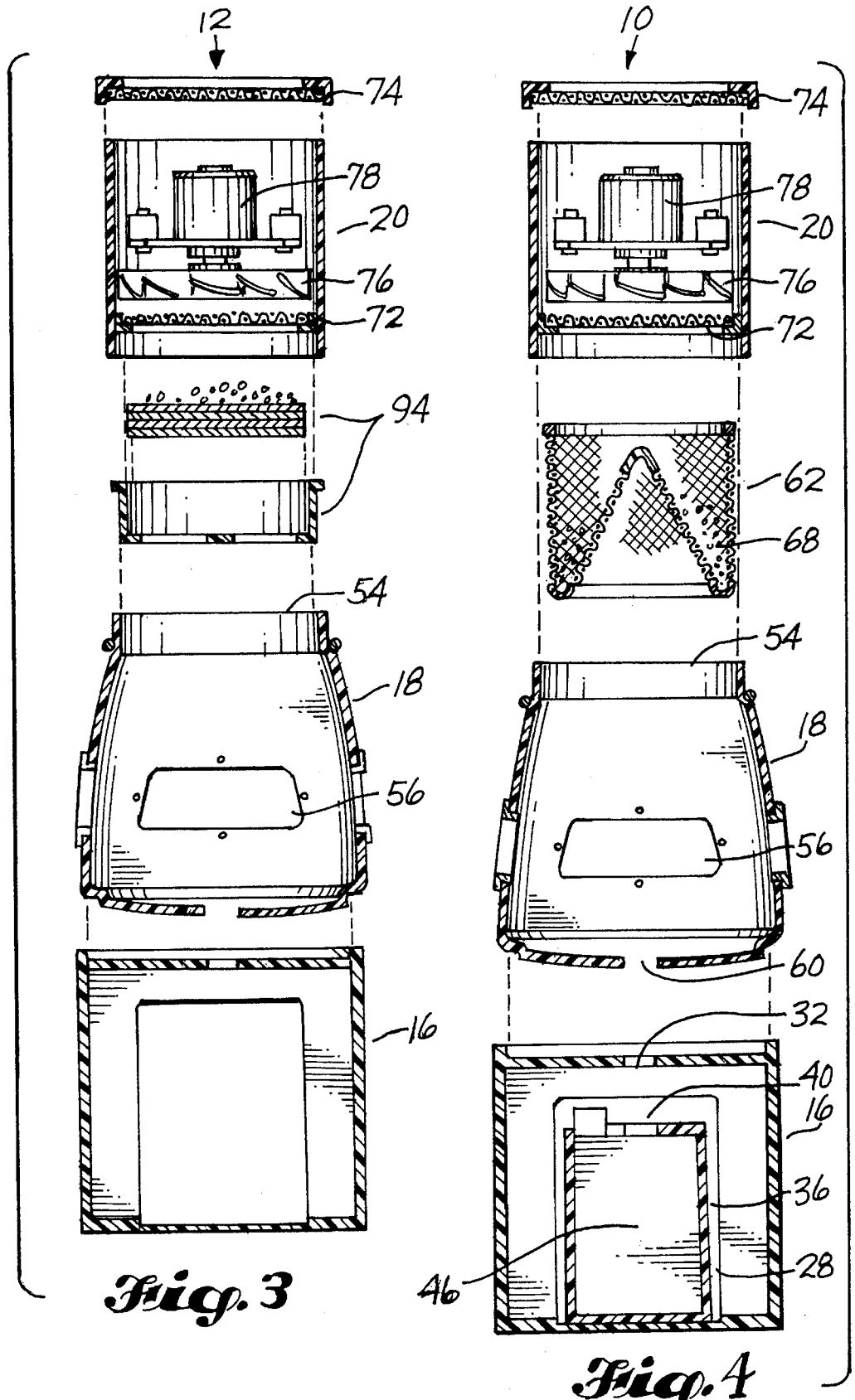

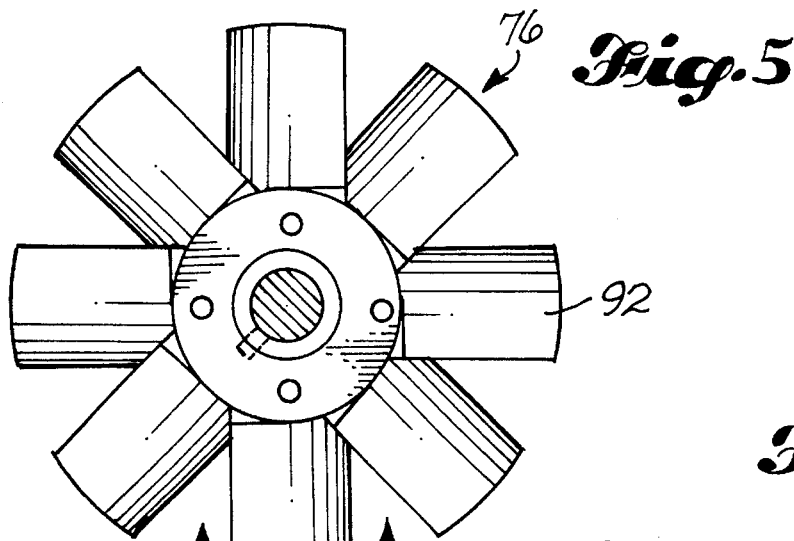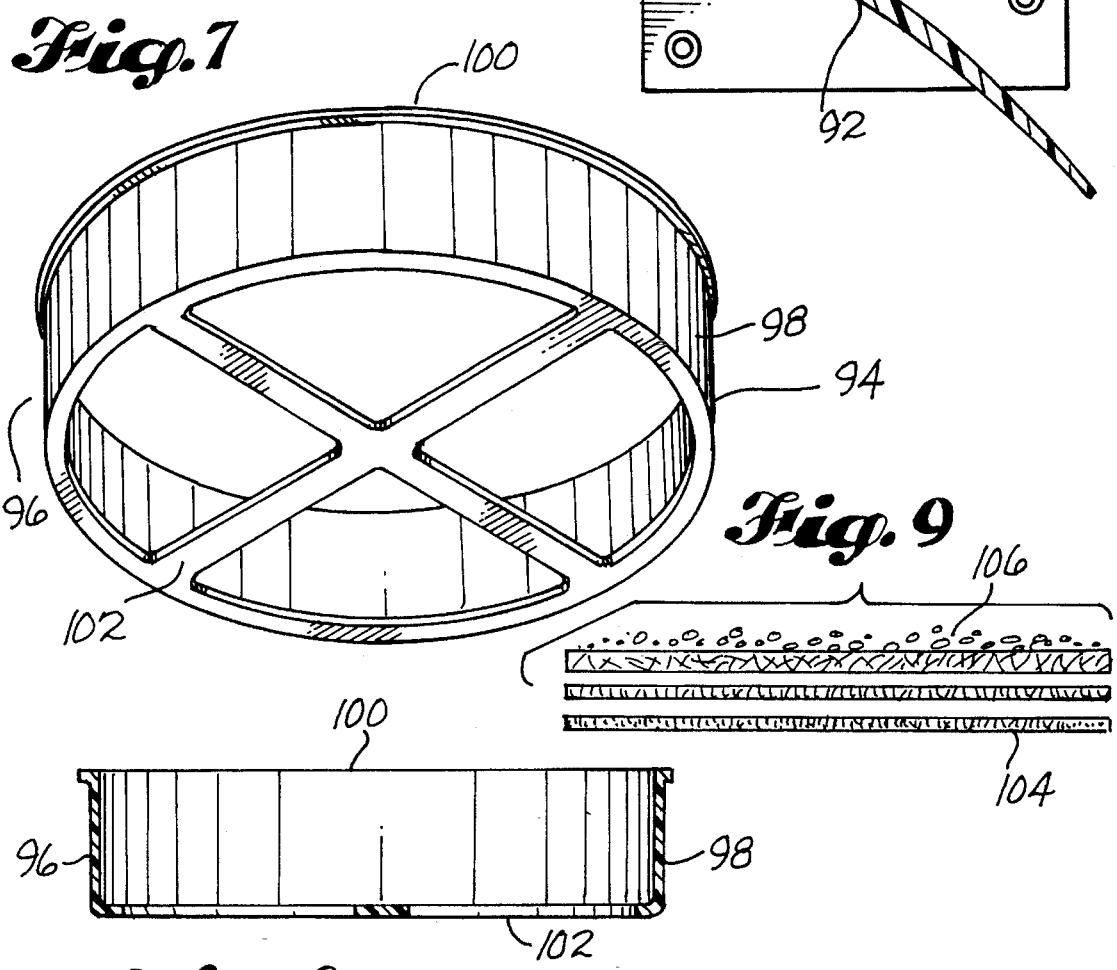

AIR PURIFICATION CONVERSION CARTRIDGE FOR DEHUMIDIFIER

TECHNICAL FIELD

This invention relates to a cartridge for rapid conversion of a commercial, portable dehumidifier to a high-volume air purifier.

BACKGROUND OF THE INVENTION

Dehumidifiers have been used for many years in various forms to remove excess moisture from the air. There are three basic types of dehumidifiers: refrigeration, deliquescent, and desiccant. In all three types, moist air is drawn into the dehumidifier by a motor driven fan and the dehumidified air exits the system back into the surrounding atmosphere. In a desiccant dehumidifier, desiccant material in the form of a reusable drying wheel is used to absorb liquid. In a deliquescent dehumidifier, non-reusable desiccant material is used to absorb moisture, which is then condensed to a liquid and channeled to an exit path or receptacle. Commercial portable dehumidifiers have been used extensively for clean up of humid air after a flood or a fire where sprinkler systems have been activated. Large deliquescent and desiccant dehumidifiers are used for commercial purposes because of the high volume air they can dry. These types of dehumidifiers, although portable and efficient, are costly to manufacture and store, usually being held for emergency use.

Air purification of many different types are well known. Generally, air is moved via a motor driven fan through some type of filtering or odor removing media. Commercial portable air purifiers have been used to filter malodors and fine particulates from the air in situations such as smoke damage, paint or other toxic smells, and where extremely filtered air is required, such as in hospitals. To purify under such conditions, the air intake must be high volume to effectively filter out the dust/particulates and odors. This type of air purifier is large, and, as such, takes up a lot of space, and is expensive.

Commercial portable dehumidifiers and air purifiers have been available as two separate pieces of equipment that are large and expensive. Although some dehumidifiers have added filtering during the dehumidification process, the applicant believes none have addressed providing a separate full-flow filter for rapid, inexpensive conversion between a dehumidifier and an air purifier. This invention addresses this issue.

DISCLOSURE OF THE INVENTION

The present invention provides an air treatment unit that is readily convertible between a dehumidifier and an air purifier that has a housing providing an airflow conduit. Inside the housing is a motor driven fan positioned to move a high volume of air through the conduit. Two interchangeable cartridge units are each sized to substantially span an entire cross section of the conduit so that substantially all of the air moved through the conduit is treated. One of the cartridge units is installed in the air treatment unit, to the exclusion of the other, to provide either a high-volume dehumidifier or a high-volume purifier, without duplicity of housing or fan construction. The first interchangeable cartridge unit has a perforated receptacle for receiving humidity absorbing material. The second interchangeable cartridge unit has media for air purification and is substitutable with the first interchangeable cartridge unit.

In preferred form, the air treatment unit has a housing that includes a hollow interior base portion, a center portion with a plurality of intake openings and an open top, and an upper portion including a motor drive fan. The motor driven fan comprises eight blades each having a 33 degree pitch and is made of polypropylene material. When acting as a high-volume dehumidifier, the air treatment unit includes the first interchangeable cartridge unit, which is made from a stainless steel mesh basket assembled with a conical mesh insert. Humidity absorbing material is inserted in the basket.

In another preferred form, the air treatment unit, when acting as a high-volume air purifier, has a second interchangeable cartridge unit, which comprises a basket made from polyester material and various filter layers. The filter layers comprise at least one polyester and one carbon filter to collect dust/particulates and odors. Deodorizing crystals may be added to the top of the filter layers for additional odor enhancement.

Another aspect of the invention is a method for converting a portable dehumidifier into an air purifier. The steps include providing a dehumidifier housing comprising a hollow base portion, a center portion with a plurality of intake openings, and an open top and an upper portion including a motor driven fan, a receptacle container, and a desiccant container. The desiccant container, which holds desiccant material, rests inside the open top of the center portion. The upper portion rests on the center portion and the center portion rests on the base portion. The receptacle container fits inside the hollow interior of the base portion. The upper portion and desiccant container is readily removed, and then replaced with the air filter cartridge. The air filter cartridge comprises a basket with layers of filters stacked inside them for odor and dust particulates removal. The upper portion is then replaced on top of the center portion. In preferred form, the receptacle container is removed, when the housing is functioning as an air purifier.

Another object of this invention is directed to a removable air filter cartridge in a commercial air purifier. The air filter cartridge comprises a basket having a sidewall connecting an open top and a partially open bottom. The basket accommodates various layers of filtering media, creating a sandwiching effect to trap malodors and air particulates. In preferred form, the air filter basket is made from polyester material, and the air filter layers include at least one carbon and one polyester filter. Also in preferred form, deodorizing crystals are added to the last filter layer.

Another object of this invention is directed to the air purifier that is converted from a dehumidifier. The air purifier comprises an air filter, a dehumidifier housing having a hollow base portion, a center portion with a plurality of intake openings and an open top, and an upper portion including a motor driven fan. The air filter comprises a basket with a sidewall connecting an open top and a partially open bottom and a plurality of filters layered in the basket. The dehumidifier also comprises a receptacle container for holding liquid material, and a desiccant container. The desiccant container holds desiccant material and rests inside the open top of the center portion of the housing. The upper portion rests on top of the center portion and the center portion rests on a base portion. The receptacle container fits inside the hollow interior of the base portion. The air purifier is converted from the dehumidifier by removing the desiccant container and replacing it with the air filter cartridge.

The air purifier no longer requires the receptacle container, and, as such, is removed in the air purifier application. Preferably, the air filter basket is made from polyester material, and the filter is comprised of at least one carbon filter and one polyester filter. Deodorizing crystals are added to the last filter layer.

An important advantage produced by the present invention is that the same dehumidifier housing, including the base, center, and upper cylinder portions, along with its components, are used in the conversion to the air purifier. Thus, one portable apparatus acts as two separate pieces of equipment with minimal costs to inventory, use, and maintain.

These and other advantages and features will become apparent from a review of the following detailed description of the best mode for carrying out the invention, the drawing, and the claims, all which comprise the disclosure of the present invention are included herein by reference.

BRIEF DESCRIPTION OF THE DRAWINGS

Like reference numerals are used to denote like parts throughout the several figures of the drawing, and:

FIG. 3 is an exploded partial cross-sectional view of an air purifier, with motor and fan housing cut-away;

FIG. 4 is an exploded partial cross-sectional view of a dehumidifier, with motor and fan housing cut-away;

FIG. 5 is a front view of the fan used for both the dehumidifier and air purifier;

FIG. 6 is a cross-sectional view of a single fan blade taken substantially across line 6—6 from the fan depicted in FIG. 5;

FIG. 7 is a pictorial view of a filter basket of the air filter cartridge;

FIG. 8 is a cross-sectional view of the filter basket;

FIG. 9 is a cross-sectional view depicting layers of filtering media and deodorizing crystals for the filter basket.

BEST MODE FOR CARRYING OUT THE INVENTION

Figure 2:
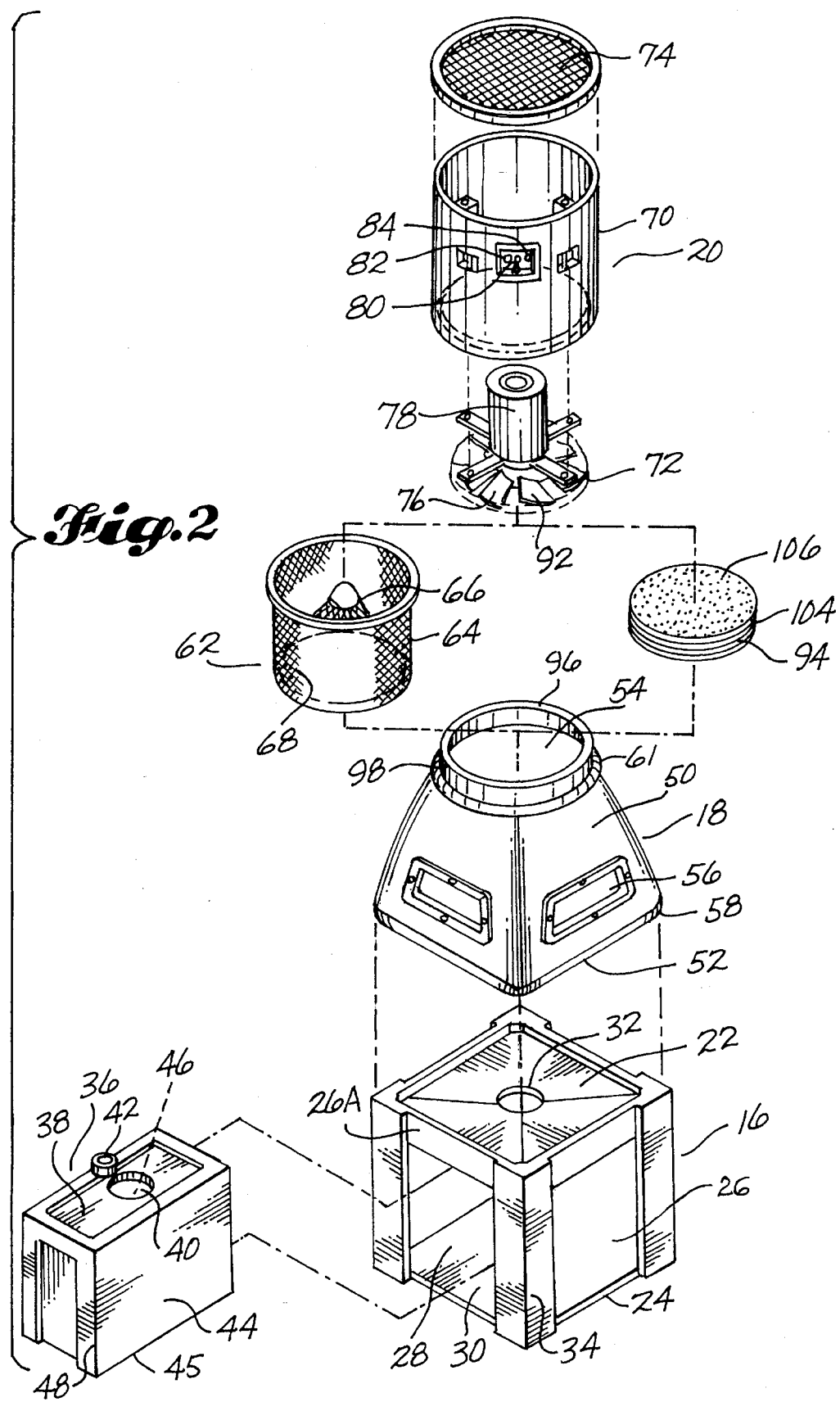
FIG. 2 is an exploded pictorial view of a dehumidifier housing depicting the conversion to an air purifier by interchanging a desiccant container with an air filter cartridge and removing a receptacle container.

Referring to FIGS. 2 and 4, in preferred form, the dehumidifier 10 is a portable, deliquescent commercial unit having a molded plastic housing 14 consisting of a base portion 16, and center portion 18, and an upper cylinder portion 20.

The base portion 16 consists of a top panel 22, a bottom panel 24, and four sidewalls 26 forming a large hollow interior 28. In preferred form, the shape of the base portion is roughly a cube for stability. Each sidewall 26, top panel 22 and bottom panel 24 is roughly in the shape of a square.

One of the sidewalls 26A includes an opening 30 in sidewall 26A leading into hollow interior 28 of base portion 16. The hollow interior 28 could be closed through some form of door or covering over sidewall opening 30, although in preferred form, the opening 30 to the hollow interior 28 remains uncovered. The top panel 22 of the base portion 16 forms an opening 32, which is generally circular in shape and is in the center of the top panel 22. The four sidewalls 26, 26A are joined to each other at four corners 34. The corners are reinforced with an extra thickness of molded plastic for stability, strength, and aesthetic appeal.

A receptacle container 36 having a roughly rectangular shape is of such a size as to fit inside the hollow interior 28 of the base portion 16 through the one sidewall opening 30. The receptacle 36 is made of the same molded plastic as that of the housing 14 and is molded in one piece. The receptacle 36 has a top panel 38 that forms an opening 40, a vent 42, and four sidewalls 44, and a flat stable bottom panel 45. The receptacle has a hollow opening 46 inside the four sidewalls 44, top panel 38 and bottom panel 45. The four sidewalls 44 meet at four corners 48, that are reinforced with an extra thickness of molded plastic for stability and strength. The corners are also aesthetically appealing and are consistent appearance-wise with the base portion corners 34.

The center portion 18 comprises a sidewall 50, a bottom panel 52 that is essentially square in shape, an open top section 54 that is essentially circular in shape and that has a diameter that is smaller than the width across the bottom panel 52 and where the sidewall 50 connects to both the bottom panel 52 and the open top section 54. The sidewall 50 also incorporates intake openings 56, located near the bottom panel 52 approximately one-third the distance from the bottom panel 52 to open top section 54. Intake openings 56 may be of various shapes, however, in the best mode, intake openings 56 are trapezoidal in shape. The bottom panel 52 has four corners 58. From four corners 58, the bottom panel has an approximately 5–10 degree slope to the center of the bottom panel where a cylindrical drainage opening 60 is formed. The center portion 18 also includes a rubber ring 61 that extends around the exterior of the cylindrical top section approximately 2–5 inches below open top section 54, and is essentially an aesthetic buffer between the center portion 18 and the upper cylinder portion 20.

Resting inside open top section 54, is the desiccant container 62, which in preferred form is a cylindrical stainless steel mesh screen basket 64 integral with a stainless steel mesh screen conical insert 66 where the conical base fits the bottom of the desiccant container. Desiccant material 68, such as granular calcium chloride, is placed in the narrow area ring between the base of conical insert 66 and the mesh screen basket 64.

The upper cylinder portion 20 comprises a sidewall 70, which connects a bottom screen 72, and a top screen 74. The upper cylinder portion is essentially a cylinder that houses the electronmechanical components of the device: a fan 76, the motor 78, a electrical switch 80, a indicator light 82, and fuse and fuse holder 84. An electrical power cord 86 is attached to upper cylinder portion 20 at its proximal end 88 and has a standard grounded electrical plug 90 at its distal end. Referring to FIG. 5, fan 76 consists of eight blades 92 and is made of polypropylene on an aluminum hub. Referring to FIG. 6, each fan blade 92 defines an arc such that the fan runs most efficient in concert with motor 78, which in the preferred form is a 240 watt, single phase, split capacitor ⅙ hp motor.

When the motor and fan are activated, dehumidifier 10 draws in moist air at a rate of approximately 830 cfm through intake openings 56 in center portion 18. The moist air is forced through desiccant container 62. The air suction of the fan pulling the moist air through desiccant material 68 condenses the liquid from the moist air. The liquid drips from mesh screen basket 64, through cylindrical drainage opening 60 of center portion 18, through opening 32 of base portion top panel 22, and into receptacle container 36. The remaining drier air is drawn through bottom screen 72 of upper cylinder portion 20, past fan 76 and motor 78, and out into the room atmosphere through top screen 74.

Referring to FIG. 2, to convert dehumidifier 10 to air purifier 12, desiccant container 62 is removed and replaced with an air filter cartridge 94, which rests in the same location into open top section 54 of center portion 18. Air filter cartridge 94 spans the entire area of the open top section 54, thereby drawing all the intake air through air filter cartridge 94 for full-flow filtration. When the dehumidifier is converted to an air purifier, the device is no longer functioning as a dehumidifier, and no longer requires receptacle container 36. Hollow interior 28 of base portion 16 may be used to store replacement filter cartridges.

Referring to FIGS. 7–9, air filter cartridge 94 comprises of a rigid polyester basket 96, as shown in FIGS. 7 and 8, which includes a sidewall 98, an open top 100, and partially open bottom 102. Referring to FIG. 9, basket 96 is layered with various filter media 104.

Figure 10:
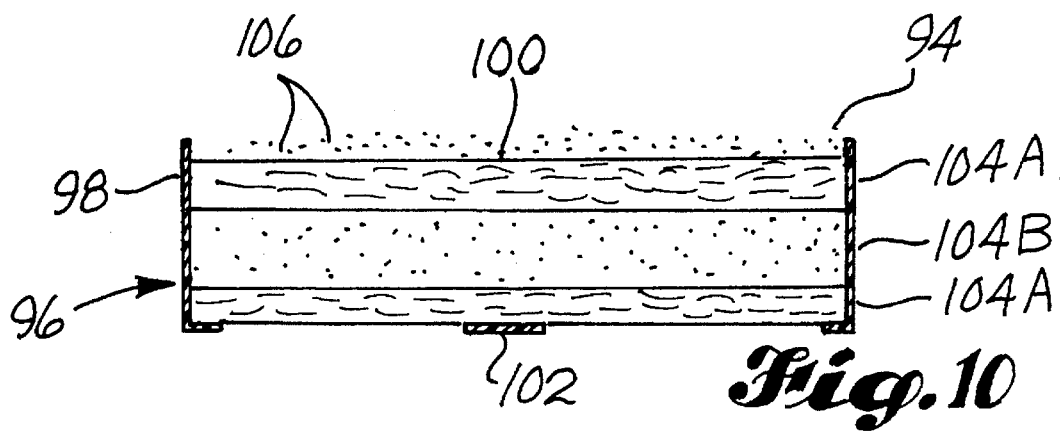
FIGS. 10–12 are cross-sectional views of various filter media configurations.
Figure 11:
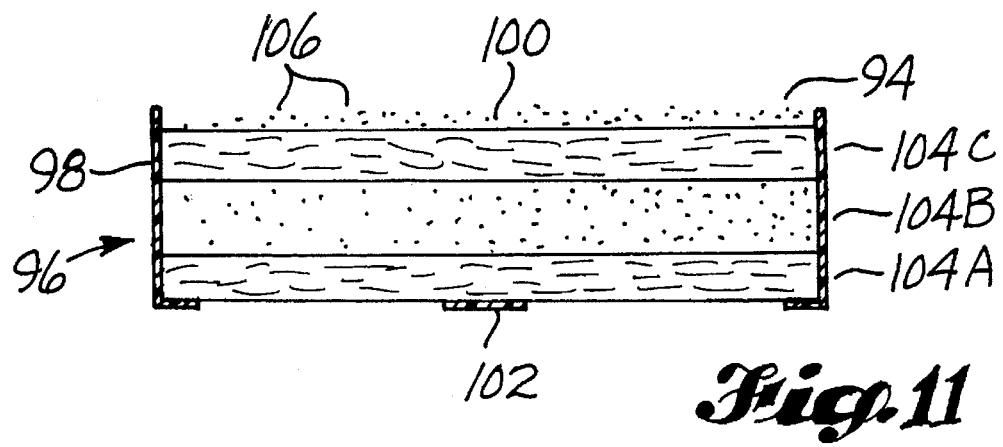
Figure 12:
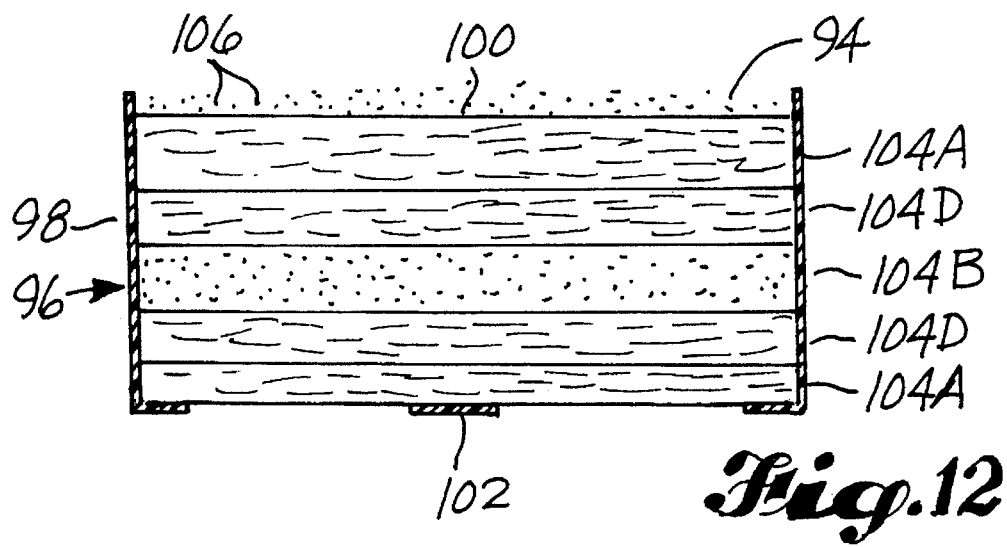

Two sizes of baskets 96 may be used: an approximately three-inch deep basket with three layers of filters, and an approximately five-and-a-half-inch deep basket with up to five layers of filters. A three-inch basket would have a raw or activated carbon filter 104B, which traps noxious odors, sandwiched in between a polyester filter layer 104A or fiberglass filter layer 104C. Both the polyester and fiberglass filters trap and collect air particulates. In preferred form, a five-and-a-half-inch basket would have a carbon filter 104B sandwiched in between four layers of polyester filter 104A and fiberglass filter 104C. If the purifier was used for severe duty, a stack of filters comprising a polyester 104A or fiberglass 104C, hospital grade cotton 104D, which collects dust and fine particulates, carbon 104B, another hospital grade cotton 104D, topped off with a polyester 104A or fiberglass 104C filter may be used. Hospital grade cotton filter 104D may also be used in the three-inch basket. Various filter media configurations are shown in FIGS. 10–12. The type of filter media configuration will depend on the atmospheric condition of the room that needs to be purified. Deodorizing compound crystals 106 may be added to the top of the filter layers, which crystals aid in replacing any malodors with a benign or pleasant odor. The combination of the polyester of basket 96 and filter 104A and the polypropylene of fan 76 are believed to create an electrostatic effect for enhanced dust removal.

Figure 1:
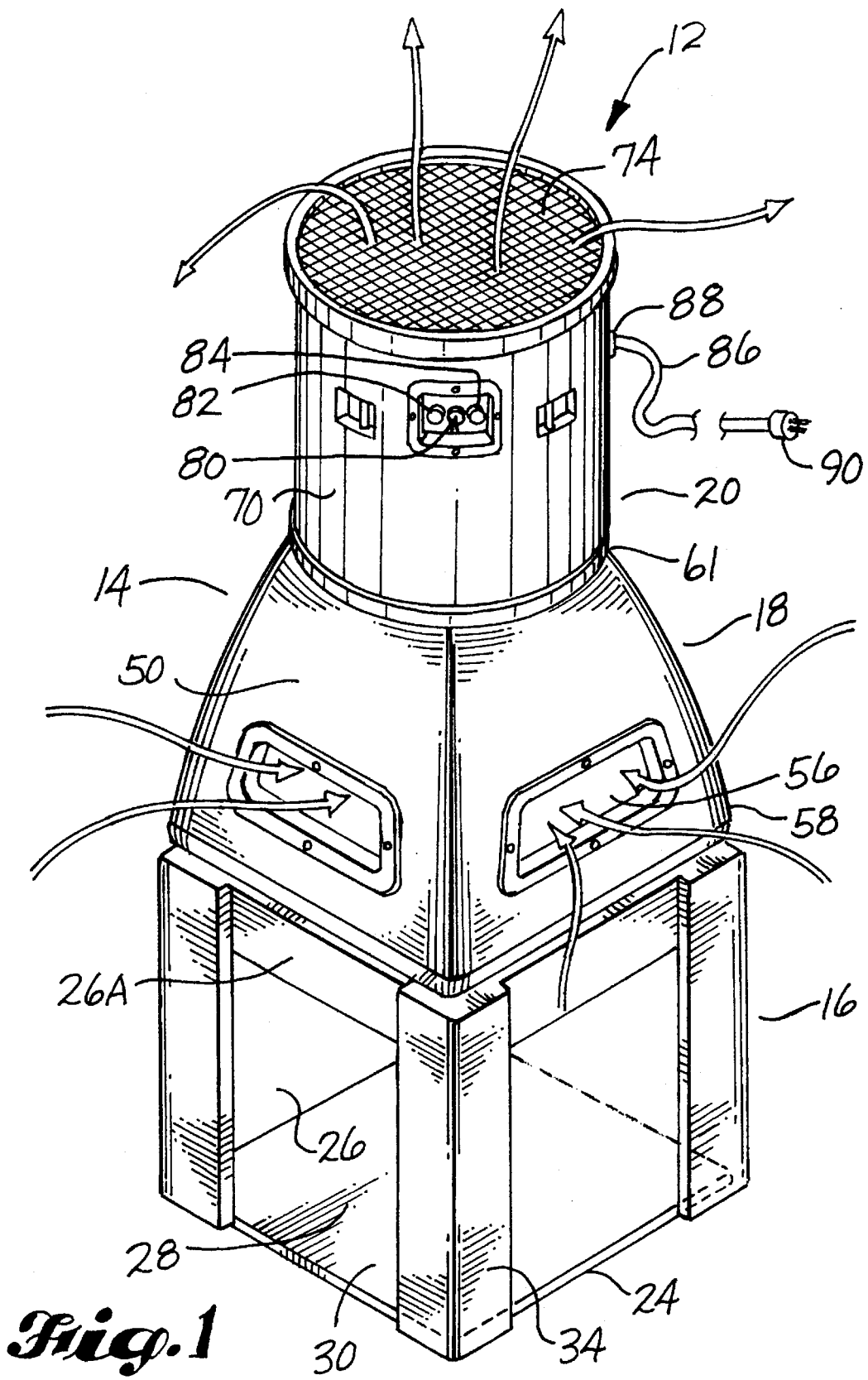
FIG. 1 is a pictorial view of the air purifier depicting the base, center, and upper cylinder portions and depicting air flow through intake openings of a center portion and purified air exiting through an upper cylinder portion.

Referring to FIGS. 1 and 3, when the air purifier is activated, the surrounding air is drawn into the air purifier at approximately 830 cfm through intake openings 56 of center portion 18 and through filter layers 104 of air filter cartridge 94. Dust/particulates are collected in the polyester or fiberglass filter layers. Odors are removed in the carbon filter layer. The purified air is drawn through upper cylinder portion 20 and through bottom screen 72, which is of fine enough mesh to block any deodorizing crystal compound 106 from coming into upper cylinder portion 20. The purified air is then drawn past fan 76 and motor 78, and out through top screen 74 into the room atmosphere.

Two important advantages of this invention are 1) the ease and quickness in converting the dehumidifier to the air filter by lifting off upper cylinder portion 20, removing desiccant container 62 and replacing it with air filter cartridge 94, and replacing upper cylinder portion 20; and 2) the savings in terms of dollars and space to have one large housing 14, which has an expensive motor and fan, to be easily converted into two major commercial devices with the addition of a relatively inexpensive air filter cartridge.

The illustrated and described embodiments are presented by way of example. The scope of protection is not to be limited by these examples. Rather, protection is to be determined by the claims that follow, construed in accordance with the established rules of patent claim construction, including use of the doctrine of equivalents.

What is claimed is:

1. A method of converting a dehumidifier to an air purifier comprising:

providing a dehumidifier housing having a hollow base portion, a center portion with a plurality of intake openings and an open top, an upper portion including a motor driven fan, a receptacle container, and desiccant container holding desiccant material, said desiccant container resting inside the open top of the center portion, said upper portion resting on the center portion, and the center portion rests on the base portion, and said receptacle fitting inside the hollow interior of the base portion;

removing the upper portion;

removing the desiccant container;

replacing the desiccant container with an air filter cartridge having a basket with a sidewall connecting an open top and a partially open bottom, a plurality of filters being layered in said basket; and replacing the upper portion.

2. A method according to claim 1, wherein the receptacle container is also removed.

3. Art air filter cartridge for an air purifier comprising:

a basket that has a sidewall connecting an open top and a partially open bottom;

a plurality of filters layered in said basket;

wherein said air filter cartridge fits into a dehumidifier housing having a base portion having a hollow interior; a center portion having a plurality of intake openings and an open top; an upper portion having a fan, motor, and electrical conducting component, and wherein the air filter cartridge rests inside the entire open top of the center portion, the upper portion rests on the center portion, and the center portion rests on the base portion.

4. An air filter cartridge according to claim 3, wherein said basket is made from polyester material.

5. An air filter cartridge according to claim 3, wherein said plurality of filters comprises at least one carbon filter.

6. An air filter cartridge according to claim 3, wherein said plurality of filters comprises at least one polyester filter.

7. An air filter cartridge according to claim 3, wherein said plurality of filters comprises at least one polyester and one carbon filter.

8. An air filter cartridge according to claim 3, wherein deodorizing crystals are added to the last filter layer.

9. An air purifier that is converted from a dehumidifier, comprising:

an air filter cartridge having a basket with a sidewall connecting an open top and a partially open bottom and a plurality of filters layered in said basket; and a dehumidifier housing having a hollow base portion, a center portion with a plurality of intake openings and an open top, an upper portion including a motor driven fan, a receptacle container, and desiccant container holding desiccant material, said desiccant container resting inside the open top of the center portion, said upper portion resting on the center portion, and said center portion resting on the base portion, and the receptacle container fits inside the hollow interior of the base portion;

wherein the desiccant container is replaced with said air filter cartridge.

10. An air purifier according to claim 9, wherein the receptacle container is removed.

11. An air purifier according to claim 9, wherein said basket is made from polyester material.

12. An air purifier according to claim 9, wherein said plurality of filters comprises at least one carbon filter.

13. An air purifier according to claim 9, wherein said plurality of filters comprises at least one polyester filter.

14. An air purifier according to claim 9, wherein said plurality of filters comprises at least one polyester and one carbon filter.

15. An air purifier according to claim 9, wherein deodorizing crystals are added to the last filter layer.

16. An air purifier according to claim 9, wherein the fan comprises eight blades having a 33 degree pitch.

17. An air purifier according to claim 16, wherein said blades are made of polypropylene material.

18. An air purifier according to claim 9, wherein said fan comprises fan blades made of polypropylene.

19. An air treatment unit readily convertible between a dehumidifier and an air purifier, comprising:

a housing providing an airfoil conduit with an inlet and an outlet;

a motor driven fan positioned to move a high-volume of air through the conduit;

interchangeable cartridge units, each sized to substantially span an entire cross-section of the conduit to provide treatment to substantially all of the air moved through the conduit, a first unit having a perforated receptacle for receiving humidity absorbing material and a second unit having a frame substitutable in position with said perforated receptacle and including air purification media, wherein each of the first and second interchangeable cartridge units are installed in an air treatment unit to the exclusion of the other to provide either a high-volume dehumidifier or high-volume air purifier without duplicity of housing or fan structure.

20. An air treatment unit according to claim 19, wherein said housing comprises a hollow base portion, a center portion with a plurality of intake openings and an open top, an upper portion including the motor driven fan, said upper portion resting on the center portion, and said center portion resting on the base portion.

21. An air treatment unit according to claim 20, wherein said first and second interchangeable cartridge units rest inside of and span said open top of said center portion.

22. An air treatment unit according to claim 19, wherein said fan comprises eight blades having a 33 degree pitch made of polypropylene material.

23. An air treatment unit according to claim 19, wherein said first interchangeable cartridge unit includes a stainless steel mesh basket integral with a conical mesh insert.

24. An air treatment unit according to claim 23, wherein deodorizing crystals are added to the last filter layer.

25. An air treatment unit according to claim 19, wherein said second interchangeable cartridge unit comprises a basket that has a sidewall connecting an open top and a partially open bottom, and a plurality of filters layered in said basket.

26. An air treatment unit according to claim 25, wherein said basket is made from polyester material.

27. An air treatment unit according to claim 25, wherein said plurality of filters comprises at least one polyester and one carbon filter.

* * * * *

UNITED STATES PATENT AND TRADEMARK OFFICE
CERTIFICATE OF CORRECTION

PATENT NO. : 5,478,379
DATED : December 26, 1995
INVENTOR(S) : Rick C. Bevins

It is certified that error appears in the above-indentified patent and that said Letters Patent is hereby corrected as shown below:

On the title page, item [56], "U.S. Patent Documents", "Barkness" should be --Burkness--.

Column 6, line 30, claim 3, "Art" should be --an--.

Signed and Sealed this

Eleventh Day of June, 1996

Attest:

BRUCE LEHMAN

*Attesting Officer*     Commissioner of Patents and Trademarks